No. 624,060. Patented May 2, 1899.
A. MASSON & E. FORTIN.
MACHINE FOR TURNING PEARL BUTTONS, &c.
(Application filed Oct. 10, 1898.)
(No Model.) 2 Sheets—Sheet 1.
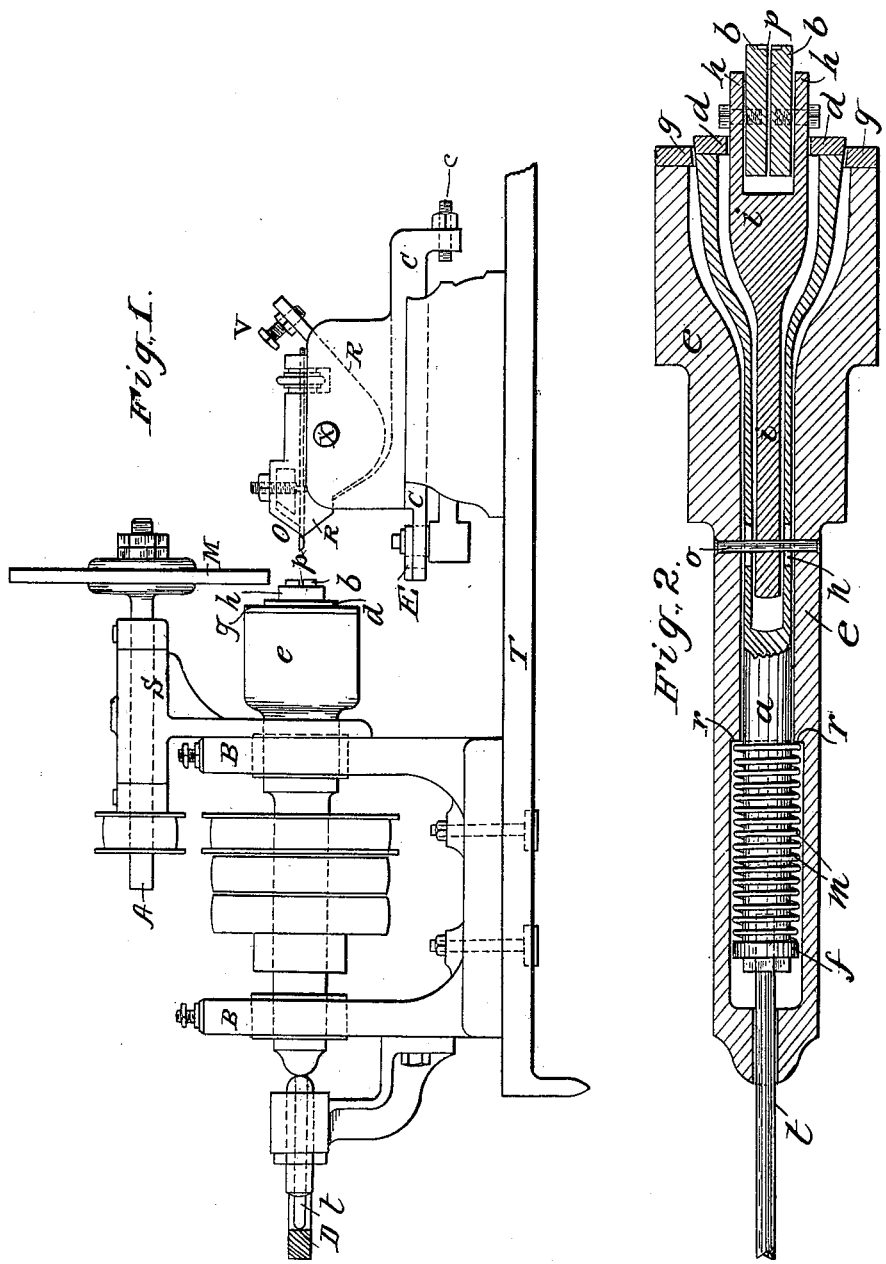

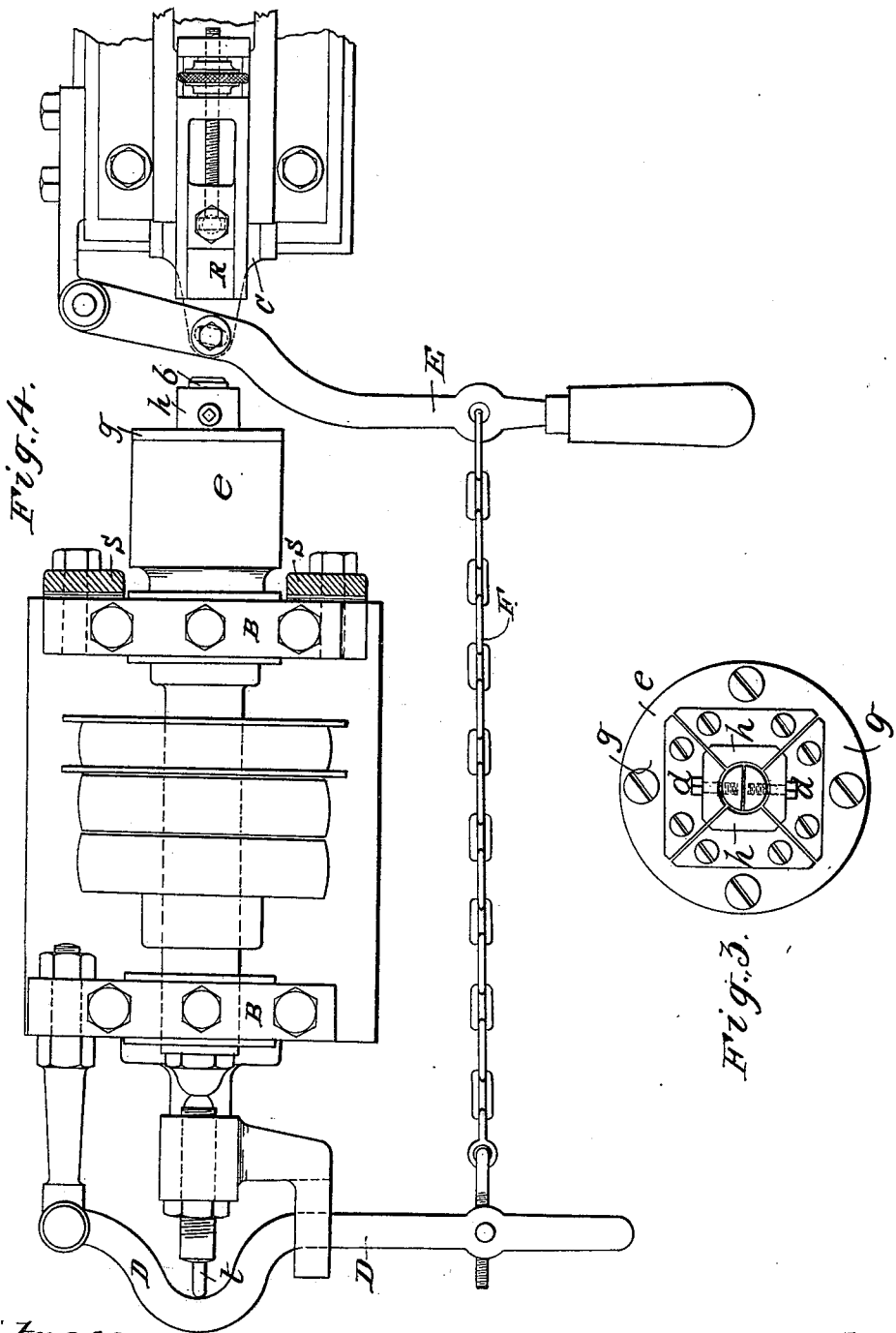

United States Patent Office.

ALFRED MASSON, OF BEAUVAIS, AND EDOUARD FORTIN, OF PARIS, FRANCE.

MACHINE FOR TURNING PEARL BUTTONS, &c.

SPECIFICATION forming part of Letters Patent No. 624,060, dated May 2, 1899.

Application filed October 10, 1898. Serial No. 693,182. (No model.)

*To all whom it may concern:*

Be it known that we, ALFRED MASSON, of Beauvais, (Oise,) and EDOUARD FORTIN, of Paris, in the Republic of France, have invented a new and useful Improvement in Machines for Turning Pearl Buttons and other Articles, which is fully set forth in the following specification.

This invention has reference more particularly to machines for turning pearl buttons; but certain parts of the invention, particularly the improvements in the chuck or workholder, may be advantageously used for other purposes.

Machines for turning pearl buttons are well known and their construction need not be specifically described.

The object of the present invention is to improve upon the construction of these machines. The chuck, which is of costly construction, received a reciprocating motion toward and from a stationary tool-holder, or in some forms of machines in which the tool-holder was movable and the chuck relatively stationary the latter had a slight reciprocating movement in order to open and close the chuck-jaws. In consequence there was a variation in the amplitude of the forward movement of the chuck and a variation in the cut. Frequently the tool came into contact with the face of the chuck, quickly injuring and wearing the same. In these machines, moreover, it was necessary to employ a different tool with each grade of thickness of the blanks.

In the machine constructed according to the present invention the chuck-jaws have no motion except that of rotation and remain always in the same vertical plane. The hollow shaft or sleeve by which the jaws are carried is mounted to rotate in fixed bearings in a stationary support. Intermediate between the chuck-spindle and its hollow supporting-shaft is a clamping device whose office is to open and close the chuck-jaws. This clamping device is in the form of a sleeve, and it is moved in one direction by the operator and in the other by a spring.

Other features of the invention and the advantages thereof can best be explained in connection with the accompanying drawings, in which—

Figure 1 is a side elevation of a turning-machine constructed in accordance with this invention. Fig. 2 is a section of the chuck. Fig. 3 is a face view of the chuck, and Fig. 4 is a plan view of the machine.

B represents the supporting-frame of the chuck, fixed to a table T, and S represents the support of the arbor A, carrying a grindstone M, the latter being above and in front of the chuck-jaws $b$. The latter consists of semicylindrical pieces of steel inserted in a recess in the head $h$ of the chuck-spindle $i$. The latter is secured by a pin $o$ to the sleeve or hollow shaft $e$, so that the two turn together. Between sleeve $e$ and spindle $i$ is another sleeve $a$, which is split for part of its length to give it elasticity and which constitutes the clamping device. This clamping-sleeve has slots $n$, through which pin $o$ passes, permitting a slight reciprocating motion, during which when sleeve $a$ moves backward the inclined surfaces $g$, acting on the inclined surfaces $d$, cause the ends of the split sleeve to clamp the jaws $b$ between the extremities $h$ of spindle $i$, so that the jaws grasp the button-blank or other article that has been placed in socket $p$. A movement in the opposite direction opens the jaws, as is obvious. The backward movement for closing the jaws is effected by a spring $m$, which bears at one end against a shoulder $r$ of sleeve $e$ and at the other against a collar $f$ on the extremity of the sleeve $a$. The forward motion is imparted by the workman through a lever D, acting against the end of rod $t$, which is connected to sleeve $a$.

The reciprocating tool-carriage C supports the tool-holder R, which is swiveled to the carriage on the swivel-pin X. The tool O is horizontal, so that when its end is ground in sharpening its alinement with respect to the axis of the chuck is not disturbed. The tool-carriage is reciprocated by means of an operating-handle E, and, as shown, this handle is preferably connected by a flexible connection, such as a chain F, with the lever D, so that the motion of the handle to the right after withdrawing the tool-holder causes the chuck-jaws to open for the removal of the turned button and the introduction of another blank.

To sharpen the tool, which is necessary at short intervals, the workman tilts holder R on its axis by pressing on the head of screw V. This brings the inclined end of tool O into a plane parallel with the surface of grinder M, and the tool-holder being at the same time advanced the sharpening is very quickly effected. For buttons of different thickness a different contour for the cutting edge of the tool is required, and heretofore it has been customary to supply a special tool for each department of cut required. With the machine of the present invention the desired variation is effected by varying the angle of inclination of the tool to the grinding-surface, which angle is regulated by the screw V. The contact of this screw with carriage C determines the extent of movement of holder R upon its pivot, and consequently the angle at which the tool is presented to the grindstone. Screw c by contact with the frame limits the forward movement of carriage C.

Having now fully described our said invention, what we claim is—

1. In a button-turning lathe, the combination of the sliding tool-carriage and an operating-lever for reciprocating the same, of a rotary sleeve, a spindle carrying chuck-jaws and fastened to said sleeve so as to rotate therewith, an intermediate clamping-sleeve having a reciprocating motion, and connections between said lever and clamping-sleeve whereby the motion of the former to withdraw the tool opens the chuck-jaws, substantially as described.

2. The combination with the relatively-stationary chuck, of a reciprocatory tool-carriage, a tool-holder swiveled therein, and a grindstone supported above the chuck, so that when the tool-holder is inclined upward and its carriage moved forward, the end of the tool will come into contact with the grinder, substantially as described.

3. The combination with the relatively-stationary chuck, and the grindstone supported above the same, of the reciprocatory tool-carriage, the tool-holder swiveled therein and supporting the tool horizontally, and a regulating-screw on said tool-holder for determining the angle of the tool when presented to the grinder.

In testimony whereof we have signed this specification in the presence of two subscribing witnesses.

ALFRED MASSON.
EDOUARD FORTIN.

Witnesses:
EDWARD P. MACLEAN,
OSKAR BRUCKMANN.